United States Patent [19]
Perettie et al.

[11] Patent Number: 5,908,817
[45] Date of Patent: Jun. 1, 1999

[54] LUBRICANTS CONTAINING A PERFLUOROPOLYALKYL ETHER AND A FLUOROALKYLPHOSPHAZENE

[75] Inventors: Donald J. Perettie, Los Gatos, Calif.; Kenneth J. Van Heel; Ted A. Morgan, both of Midland, Mich.

[73] Assignee: The Dow Chemical Company, Midland, Mich.

[21] Appl. No.: 09/080,747

[22] Filed: May 18, 1998

[51] Int. Cl.$^6$ .................................. C10M 111/04
[52] U.S. Cl. .................. 508/422; 508/582; 428/65.4; 428/65.5
[58] Field of Search .................... 508/422, 582; 428/65.4, 65.5

[56] References Cited

U.S. PATENT DOCUMENTS

| | | | |
|---|---|---|---|
| 2,876,247 | 3/1959 | Rätz et al. | 508/422 |
| 3,242,218 | 3/1966 | Miller et al. | 260/615 |
| 3,306,854 | 2/1967 | Gumprecht | 508/422 |
| 3,665,041 | 5/1972 | Sianesi et al. | |
| 3,715,378 | 2/1973 | Sianesi et al. | 260/463 |
| 4,194,983 | 3/1980 | Paciorek et al. | |
| 4,267,238 | 5/1981 | Chernega | |
| 4,268,556 | 5/1981 | Pedrotty | |
| 4,601,843 | 7/1986 | Carr et al. | 508/422 |
| 4,613,548 | 9/1986 | Lum | |
| 4,871,625 | 10/1989 | Dekura et al. | 428/695 |
| 5,015,405 | 5/1991 | Kar et al. | |
| 5,073,284 | 12/1991 | Klobucar et al. | 252/78.5 |
| 5,082,717 | 1/1992 | Yaguchi et al. | 428/207 |
| 5,099,055 | 3/1992 | Kar et al. | 558/80 |
| 5,219,477 | 6/1993 | Nader et al. | 252/26 |
| 5,230,964 | 7/1993 | Kar et al. | |
| 5,273,830 | 12/1993 | Yaguchi et al. | 428/523 |
| 5,441,655 | 8/1995 | Odello et al. | 252/49.9 |
| 5,587,217 | 12/1996 | Chao et al. | 428/65.4 |
| 5,718,942 | 2/1998 | Vurens et al. | 427/127 |

OTHER PUBLICATIONS

Dickinson, J. T., "Application of Transient Current Measurements: Evidence for Galvanic Corrosive Wear of Aluminum by a Polyperfluoroether Lubricant", WEAR, vol. 215, pp. 211–222 (1998).

Huang, Liji, "Characterization of the Head–Disc Interface for Proximity Recording", Proceedings of IEEE Intermag Society Conference, New Orleans, LA (Apr. 1997).

*Primary Examiner*—Jerry D. Johnson

[57] ABSTRACT

A lubricant comprising a mixture of a perfluoropolyalkyl ether and a phosphazene is described. The lubricant is useful in thin-film magnetic recording disk applications, where very low static and dynamical coefficients of friction are desired and balling effects are minimized.

11 Claims, 2 Drawing Sheets

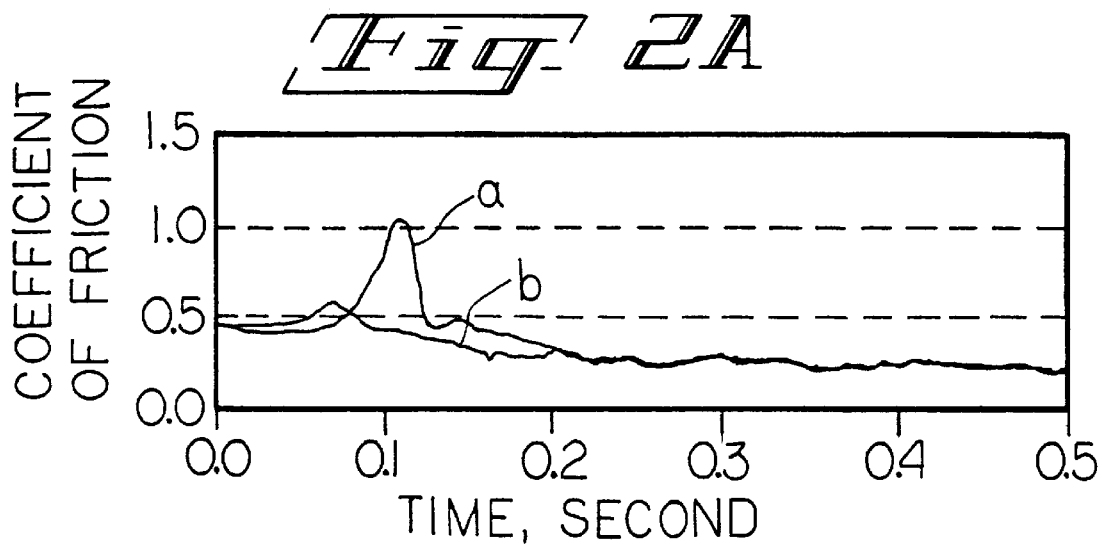
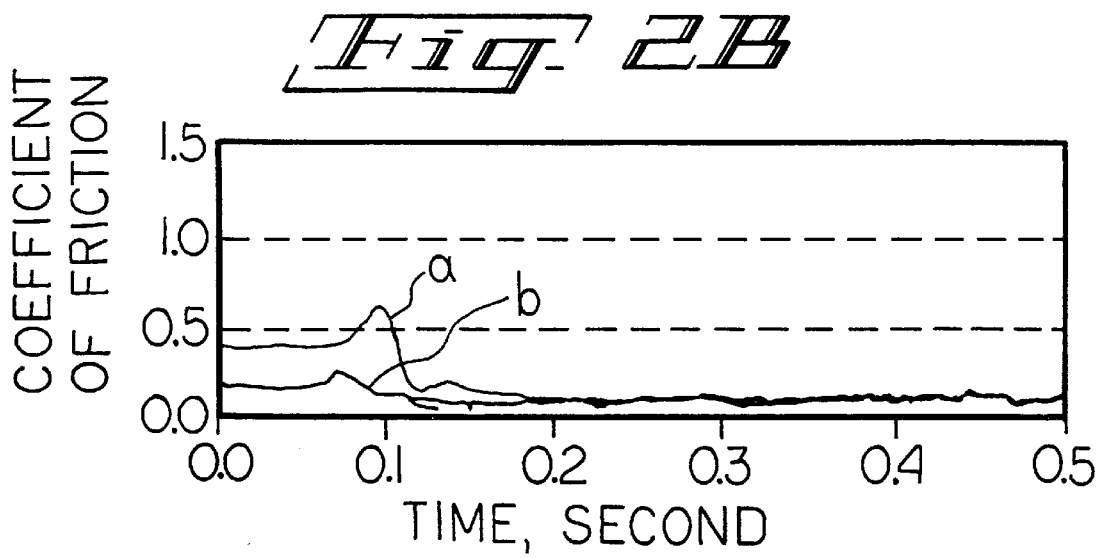
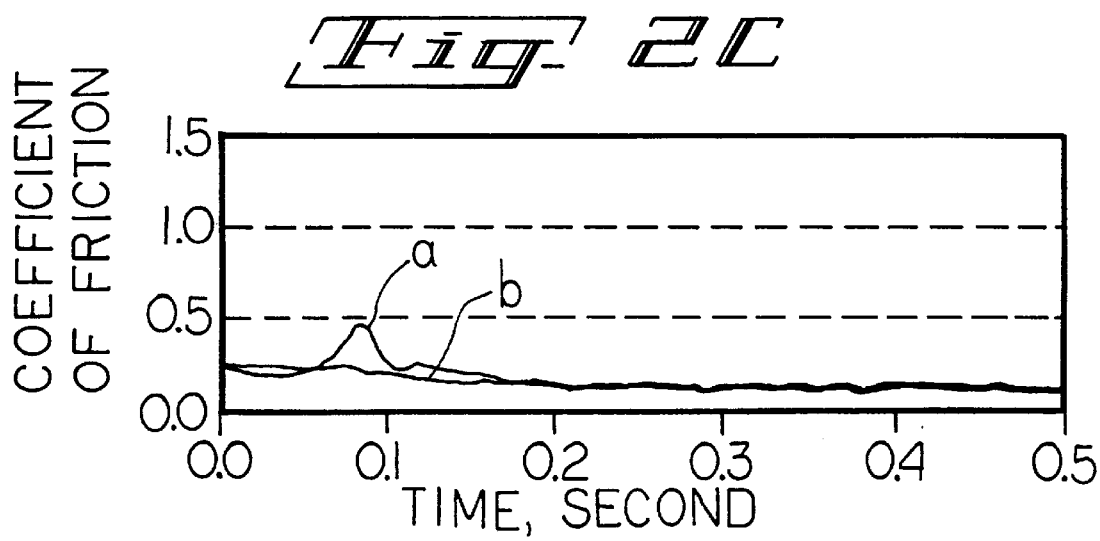

LUBRICANTS CONTAINING A PERFLUOROPOLYALKYL ETHER AND A FLUOROALKYLPHOSPHAZENE

BACKGROUND OF THE INVENTION

Thin-film magnetic disks are widely used as data storage media for digital computers. The disks are typically prepared by successive sputtering onto a rigid disk substrate, an underlayer, a magnetic layer, and a protective carbon overcoat, then lubricated with a thin film of a lubricant to reduce frictional interaction between the head and the disk, particularly during contact-start-stop (CSS) cycles. Some of the first synthetic lubricants were perfluoropolyalkylethers (PFPAEs, alternatively known as "perfluoropolyethers" or PFPEs), available on the market under trade names such as FOMBLIN™ (Montedison S.P.A.), KRYTOX™ (E.I. duPont deNemours and Company), and DEMNUM™ (Daikin Industries, Ltd.). Examples of PFPAEs are disclosed in U.S. Pat. Nos. 3,242,218, 3,665,041, and 3,715,378, incorporated herein by reference.

Although PFPAEs are excellent wetting agents, and can be applied to the surface of a medium at thicknesses approaching that of a monolayer, they have very low adsorptivity to substrates such as metal, glass, ceramic, and carbon. Thus, PFPAEs can easily peel off the surface of the substrate to which it is applied. Attempts have been made to improve PFPAE adsorptivity by adding polar functionality (see U.S. Pat. Nos. 4,267,238 and 4,268,556), but these approaches are still wanting (see U.S. Pat. No. 4,871,625, column 2, lines 14–35, incorporated herein by reference). Still another problem with PFPAEs is that they are sensitive to Lewis acid catalyzed chain scission, particularly in the proximity of aluminum oxide/TiC, which is present in the slider portion of the recording medium. (See *Wear*, Vol. 215, pp. 211–222 (1998).)

Phosphazenes have been used as an alternative to PFPAEs as lubricants for thin-film magnetic disks. Examples of phosphazene lubricants are disclosed, for example, in U.S. Pat. No. 5,015,405, incorporated herein by reference. Although phosphazenes are stable to hydrolysis in the presence of aluminum oxide, they suffer from poor substrate wettability. Efforts to improve the tribological behavior of the head/disk interface under hot/wet conditions have resulted in the discovery of hybrids of a phosphazene and a PFPAE, that is, phosphazenes that contain high molecular weight PFPAE pendant groups (300 Daltons to 50,000 Daltons, as disclosed in U.S. Pat. Nos. 4,871,265 and 5,441,655, incorporated herein by reference). However, this approach requires the use of expensive and esoteric high molecular weight perfluorinated polyether starting materials.

An alternative to PFPAE/phosphazene hybrids is a mixture containing both a phosphazene and a PFPAE, as disclosed in U.S. Pat. No. 5,587,217, incorporated herein by reference. The phosphazene is described as a hexaphenoxy-cyclophosphazene compound substituted with fluorine, a fluorinated alkyl group, or a fluorinated alkyl ether group. The preferred phosphazene is X-1P (originally disclosed in U.S. Pat. No. 5,099,055, incorporated herein by reference), which has the following structure:

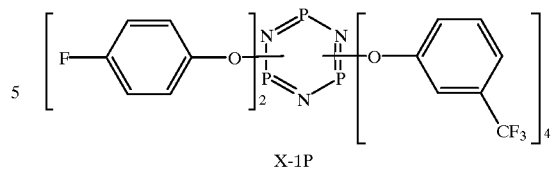

X-1P

X-1P, in combination with Z-DOL and at levels of up to 5 weight percent, reduces stiction and increases the stability of Z-DOL, presumably by deactivating the aluminum oxide/TiC. However, because X-1P is virtually immiscible with PFPAE lubricants, phase separation occurs at the optimal phosphazene:PFPAE ratios. This phase separation leads to chemical nonuniformity of the lubricant on the disk (a so-called balling effect), which tends to affect the durability of the head/disk interface, particularly when the thickness of the X-1P is greater than 1 Å. (See Huang et al., *Characterizations of the Head-Disc interface for Proximity Recording*, Proceedings of IEEE Intermag Society Conference, New Orleans, La., April, 1997.) On the other hand, X-1P/PFPAE mixtures do not show performance enhancement over the PFPAE alone at an X-1P layer thickness of less than 1 Å or at concentrations less than 1 weight percent. Thus, the effective concentration window for X-1P is quite narrow, and special process control is required to achieve optimal performance.

In view of the deficiency in the art of lubricant compositions for hard disk applications, it would be desirable to find a comparatively inexpensive composition that does not phase separate at concentrations effective to provide excellent tribological performance and that substantially reduces the need for tight process control.

SUMMARY OF THE INVENTION

The present invention addresses the deficiencies in the art by providing a composition comprising a perfluoropolyalkyl ether and a cyclic phosphazene having the formula:

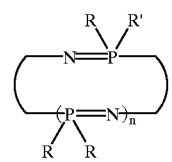

where R' is —OCH$_2$(CF$_2$)$_q$—X; and each R is independently —OAr$_f$ or —OCH$_2$(CF$_2$)$_q$—X; where Ar$_f$ is phenyl, halophenyl, phenyl oxyalkanol, or perhaloalkylphenyl; n is 2 or 3; each q is independently an integer from 1 to 5; and each X is independently H or F.

In another aspect, the present invention is an improved thin-film magnetic recording disk comprising a substrate, a magnetic recording film disposed on the substrate, and a protective overcoat disposed on the recording film, wherein the improvement comprises disposing an outer lubricant layer on the overcoat, which outer lubricant layer comprises a mixture of a perfluoropolyalkyl ether and a phosphazene having, the formula:

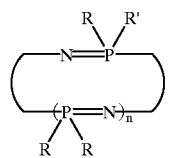

where R' is —OCH$_2$(CF$_2$)$_q$—X; and each R is independently —OAr$_f$ or —OCH$_2$(CF$_2$)$_q$—X; where Ar$_f$ is phenyl, halophenyl, phenyl oxyalkanol, or perhaloalkylphenyl; n is 2 or 3; each q is independently an integer from 1 to 5; and each X is independently H or F.

The composition of the present invention provides a cost-effective lubricant mixture that can improve durability at the head/disk interface as compared to lubricants containing X-1P and a PFPAE. Moreover, this lubricant composition can provide a wider processing window without undesirable balling, and is therefore less sensitive to small changes in PFPAE/phosphazene ratios, as well as changes in the thickness of lubricant layer.

BRIEF DESCRIPTION OF THE DRAWINGS

FIG. 2A is a graph of the coefficient of friction during start-up vs. time for Z-DOL;

FIG. 2B is a graph of the coefficient of friction during start-up vs. time for Z-DOL and X-1P; and FIG. 2C is a graph of the coefficient of friction during start-up vs. time for Z-DOL and NF-100.

DETAILED DESCRIPTION OF THE INVENTION

Figure 1A:
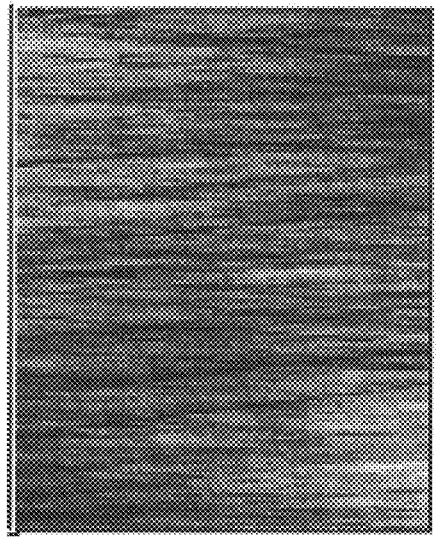
FIG. 1A is a computer-generated photograph of pure Z-DOL on a nitrogenated disk.

In a first aspect, the present invention is a composition which comprises a PFPAE and a cyclic phosphazene having the formula:

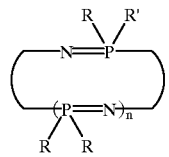

where R' is —OCH$_2$(CF$_2$)$_q$—X, and each R is independently —OAr$_f$ or —OCH$_2$(CF$_2$)$_q$—X; preferably R and R' are each independently —OCH$_2$(CF$_2$)$_q$—X; n is 2 or 3, preferably 2; each q is independently an integer from 1 to 5, preferably 2 to 4, more preferably 4; and each X is independently H or F, preferably H.

Examples of preferred PFPAEs are described in U.S. Pat. No. 5,441,655, column 5, line 45 to column 6 line 50, and in U.S. Pat. No. 5,587,217, FIG. 2, and column 4, lines 20 to 34, each incorporated herein by reference. An example of a preferred PFPAE is FOMBLIN™ Z-DOL lubricant, represented by the following formula:

where m and n are integers, preferably such that the number average molecular weight is from about 1000 to about 5000 Daltons, more preferably about 2000 Daltons.

Examples of preferred R groups on the phosphazene ring include 3-trifluoromethylphenoxy, 4-fluorophenoxy, —OCH$_2$CF$_2$H, —OCH$_2$(CF$_2$)$_2$—H, —OCH$_2$(CF$_2$)$_3$—H, —OCH$_2$(CF$_2$)$_4$—H, —OCH$_2$(CF$_2$)$_5$—H, —OCH$_2$CF$_2$CF$_3$, —OCH$_2$(CF$_2$)$_2$CF$_3$, —OCH$_2$(CF$_2$)$_3$CF$_3$, and —OCH$_2$(CF$_2$)$_4$CF$_3$. More preferably, R and R' are each independently —OCH$_2$(CF$_2$)—H, —OCH$_2$(CF$_2$)$_2$—H, —OCH$_2$(CF$_2$)$_3$—H, —OCH$_2$(CF$_2$)$_4$—H, —OCH$_2$(CF$_2$)$_5$—H, —OCH$_2$CF$_2$H, —OCH$_2$(CF$_2$)$_2$CF$_3$, —OCH$_2$(CF$_2$)$_3$CF$_3$, or —OCH$_2$(CF$_2$)$_4$CF$_3$. Most preferably, R and R' are each independently OCH$_2$(CF$_2$)$_2$—H, —OCH$_2$(CF$_2$)$_3$—H, —OCH$_2$(CF$_2$)$_4$—H, or —OCH$_2$(CF$_2$)$_5$—H.

An example of a most preferred phosphazene is hexakis (1,1,5-trihydroperfluoropentoxy) cyclotriphosphazene, represented by the following structure:

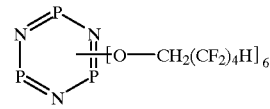

This most preferred phosphazene is commercially available under the tradename PHOSFAROL™ NF-100 lubricant (a trademark of Otsuka Chemical Co., Ltd, Osaka, Japan, and abbreviated herein as "NF-100").

Though not bound by theory, it is believed that the increased efficacy of the PFPAE/phosphazene composition of the present invention is related to its increased fluorine content. Preferably, the weight percent fluorine as a percentage of the phosphazene compound is not less than 35 percent, more preferably not less than 40 percent, and most preferably not less than 50 percent. The most preferred phosphazene, NF-100, has a fluorine content of about 60 weight percent.

The PFPAE and the phosphazene are advantageously combined in such proportions so as to provide a reduction in frictional drag on a surface relative to the reduction in drag provided by either the PFPAE or the phosphazene individually. Preferably, the weight:weight ratio of the PFPAE:phosphazene is not less than about 99.5:0.5, more preferably not less than about 99:1, and most preferably not less than about 98:2; and preferably not more than about 90:10, more preferably not more than about 95:5.

Figure 1B:
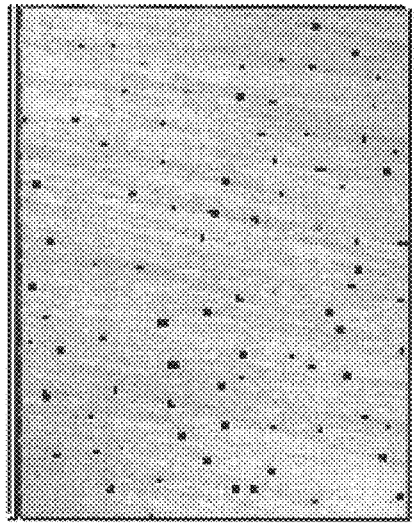
FIG. 1B is a computer-generated photograph of a mixture of Z-DOL and X-1P (3 weight percent X-1P) on a nitrogenated disk.
Figure 1C:
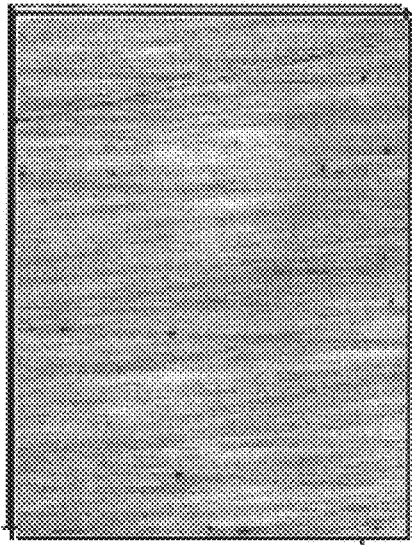
FIG. 1C is a computer-generated photograph of a mixture of Z-DOL and NF-100 (3 weight percent NF-100) on a nitrogenated disk. The thickness of each coating is 11 nm.

It has been surprisingly discovered that the Z-DOL/NF 100 compositions at a given weight:weight ratio advantageously exhibit enhanced wetting as compared to Z-DOL/X-1P compositions at the same weight:weight ratios. The consequence of the enhanced wetting is a reduction in the number of holes in the coating. Turning now to FIGS. 1A, 1B, and 1C, which illustrate the relative de-wetting of Z-DOL versus mixtures of Z-DOL/X-1P and Z-DOL/NF-100, it is observed that neat Z-DOL (FIG. 1A) exhibits no de-wetting, that is, no undesirable hole formation at a thickness of 11 nm. Similarly, a mixture of NF-100 and Z-DOL at 3 weight percent NF-100 (FIG. 1C), exhibits very little de-wetting at the same thickness. However, a mixture of Z-DOL and X-1P (FIG. 1B, not an example of the composition of the present invention) exhibits considerable undesirable hole formation. This hole formation is a believed to be a result of the chemical incompatibility of X-1P in Z-DOL, as well as surface tension differences between the two components. The consequence of hole formation is de-wetting of the coating on the substrate.

Although the thicknesses of the lubricant on the disks reproduced in FIGS. 1A, 1B, and 1C are about an order of magnitude higher than normal for the application of interest, the thicker films simulate and predict relative propensities of the compositions to exhibit balling. Thus, it is expected that over time, lubricants containing PFPAE/X-1P would exhibit balling considerably sooner than lubricants containing PFPAE/NF-100. Furthermore, when the lubricant thickness or percent of X-1P is sufficiently low that balling does not occur, the composition containing the PFPAE/X-1P has a diminished value as a lube. On the other hand, because NF-100 is more compatible with Z-DOL, the Z-DOL/NF-100 provides a significantly wider processing window than Z-DOL/X-1P.

The desirability of Z-DOL/NF-100 as a lube is further evidenced by the so-called stiction data illustrated in FIGS. 2A, 2B, and 2C. The curves (a) in each graph represent coefficient of friction during startup versus time in the first cycle after rest, and the curves (b) represent the same measure in the second cycle after rest. In this instance, the Z-DOL/X-1P and Z-DOL/NF-100 concentrations were 95:5 (0.4 percent in HFE-7100, supplied by 3M Corporation) and the film thicknesses were about 2 nm. FIGS. 2A, 2B, and 2C show that the disks lubricated with mixtures of Z-DOL and either X-1P or NF-100 (graphs 2B and 2C, respectively) exhibit considerably smaller increases in the coefficient of friction than the neat Z-DOL. In fact, Z-DOL/NF-100 (FIG. 2B) shows a smaller coefficient of friction increase than the Z-DOL/X-1P (FIG. 2C). Thus, Z-DOL/NF-100 is similar to Z-DOL/X-1P in that both provide a significant reduction in frictional drag relative to Z-DOL alone.

In a second aspect, the present invention is an improved thin-film magnetic recording disk comprising a substrate, a magnetic recording film disposed on the substrate, a protective overcoat disposed on the recording film, wherein the improvement comprises disposing an outer lubricant layer disposed on the protective overcoat which contains the PFPAE/phosphazene mixture as described herein. The thin-film recording disk comprising the substrate, the magnetic recording film, and the protective overcoat in successive layers can be obtained commercially or can be fabricated as described, for example, in U.S. Pat. No. 5,587,217, column 3, lines 36 to 67, and column 6, line 5 to column 8 line 54, which teaching is incorporated herein by reference. The magnetic recording disk may optionally include a crystalline underlayer between the substrate and the magnetic film layer.

The lubricant can be applied by any of a number of conventional methods including spray buff using a tape roll, spin coating, pull-up dip coating, or gravity draining, with gravity draining (also known as "drain coating") being preferred. Drain coating involves submerging the disk in a dilute solution of the PFPAE/phosphazene lubricant, preferably not less than about 0.001, more preferably not less than about 0.01, and most preferably not less than 0.05, and preferably not greater than about 2, more preferably not greater than about 1, and most preferably not greater than about 0.5 weight-to-weight percent of the lubricant in a solvent for the PFPAE and the phosphazene. The solvent is preferably a perfluorinated hydrocarbon, a hydrofluorocarbon, a hydrofluoroether, a chlorofluorocarbon, or a hydrochlorofluorocarbon solvent, or a combination thereof. Examples of suitable solvents include CClF$_2$—CClF$_2$, CH$_3$O—(CF$_2$)$_3$CF$_3$ (commercially available as HFE-7100), CCl$_2$F—CH$_3$(HCFC-141b), CF$_3$CHFCHFCF$_2$CF$_3$, and perfluorohexane.

The following example is for illustrative purposes only and is not intended to limit the scope of this invention.

EXAMPLE

Preparation of Disk for CSS Test

Magnetic hard disks (9.5 cm diameter, supplied by Western Digital Corporation, Santa Clara, Calif.) were cleaned for 10 minutes in HFE-7100 using an ultra-sonic bath, and allowed to air dry for about an hour. The disks were then submerged for five minutes in a stainless steel container containing a 0.1 to 0.5 weight percent solution in HFE-7100 of the lubricant to be tested. The solution was then drained from the container at a rate of 33 to 100 mm/min. The disks were then dried at room temperature in a clean air hood for at least 1 hour to evaporate the solvent. The average thickness on the carbon-overcoated magnetic hard disks was about 5 to 20 Å.

All disks used were mechanically textured with a center-line-average roughness in the landing zone of $R_a$=2.6 nm and a peak-to-mean roughness of $R_t$=13 nm. Subambient pressure sliders (50% style) were used in the experiments. The crown of the sliders was approximately 30 nm while the cross crown was about 10 nm. All sliders used were carbon coated.

CSS tests were performed to evaluate the friction performance of the various lubricant/additive combinations. All tests were performed on a disk radius of 18 mm with a head load of 35 mN. Ambient conditions of 23° C. and 40% RH were used. The tests were performed using commercially available CSS testers.

Each CSS test was run for 10,000 cycles. The profile of a typical CSS cycle consisted of an acceleration period from 0 to 5400 RPM (3 seconds), a constant speed period at 5400 RPM (3 seconds), a deceleration period from 5400 to 0 RPM (3 seconds), and a dwell period (3 seconds). The total time for a CSS cycle was 12 seconds. The coefficient of friction was measured in the middle of the constant speed period. The coefficient of friction during start-up as a function of time in a stiction test with a 12-hour dwell period before a CSS test is shown in FIGS. 2A, 2B, and 2C.

What is claimed is:

1. A composition comprising a blend of a perfluoropolyalkyl ether and a cyclic phosphazene having the formula:

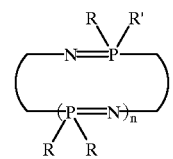

where R' is —OCH$_2$(CF$_2$)$_q$—X; and each R is independently —OAr$_f$ or —OCH$_2$(CF$_2$)$_q$—X; where Ar$_f$ is phenyl, halophenyl, phenyl oxyalkanol, or perhaloalkylphenyl; n is 2 or 3; each q is independently an integer from 1 to 5; and each X is independently H or F.

2. The composition of claim 1 wherein n is 2; and R and R' are each independently —OCH$_2$(CF$_2$)$_q$—X.

3. The composition of claim 2 wherein each X is H.

4. The composition of claim 3 wherein the phosphazene is represented by the following structure:

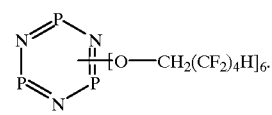

5. The composition of claim 4 wherein the perfluoropolyalkyl ether is represented by the following structure:

where m and n are integers.

6. The composition of claim 1 wherein the percent fluorine in the phosphazene compound is not less than 35 weight percent, based on the weight of the phosphazene compound.

7. The composition of claim 6 wherein the percent fluorine in the phosphazene compound is not less than 50 weight percent, based on the weight of the phosphazene compound.

8. The composition of claim 2 which is dissolved in a solvent that contains a perfluorinated hydrocarbon, a hydrofluorocarbon, a hydrofluoroether, a chlorofluorocarbon, or a hydrochlorofluorocarbon, or a combination thereof.

9. The composition of claim 8 wherein the composition is dissolved in the solvent at a weight-to-weight composition:solvent concentration of from about 0.01 to about 0.5 percent.

10. The composition of claim 8 wherein the solvent contains $CClF_2$—$CClF_2$, $CH_3O$—$(CF_2)_3CF_3$, $CCl_2F$—$CH_3$, $CF_3CHFCHFCF_2CF_3$, or perfluorohexane, or a combination thereof.

11. In an improved thin-film magnetic recording disk comprising a substrate, a magnetic recording film disposed on the substrate, and a protective overcoat disposed on the recording film, wherein the improvement comprises an outer lubricant layer disposed on the overcoat, which outer lubricant layer comprises a mixture of a perfluoropolyalkyl ether and a phosphazene having the formula:

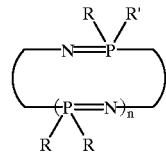

where R' is —$OCH_2(CF_2)_q$—X; and each R is independently —$OAr_f$ or —$OCH_2(CF_2)_q$—X; where $Ar_f$ is phenyl, halophenyl, phenyl oxyalkanol, or perhaloalkylphenyl; n is 2 or 3; each q is independently an integer from 1 to 5; and each X is independently H or F.

* * * * *